United States Patent Office 3,803,288
Patented Apr. 9, 1974

3,803,288
RECOVERY OF SULFUR AND IRON OXIDE FROM PYRITIC MATERIALS
Val Kudryk, Closter, Nicholas E. Mascio, Verona, and Robert F. Burke, Riverdale, N.J., assignors to The Lummus Company, Bloomfield, N.J.
Continuation-in-part of application Ser. No. 17,011, Mar. 6, 1970, which is a continuation of application Ser. No. 599,626, Dec. 6, 1966, both now abandoned. This application Jan. 24, 1972, Ser. No. 219,995
Int. Cl. C01b 7/08, 17/00; C01g 49/06
U.S. Cl. 423—83
25 Claims

ABSTRACT OF THE DISCLOSURE

Iron sulfide bearing material is leached with hydrogen chloride and the leach solution is maintained saturated with hydrogen sulfide by introducing and passing hydrogen sulfide therethrough. The pH conditions are controlled to recover iron values alone in the leach liquor or with zinc and lead values. Zinc and lead values may also be recovered under controlled conditions.

This application is a continuation-in-part of application Ser. No. 17,011 filed Mar. 6, 1970, the aforesaid application being a continuation of application Ser. No. 599,626, filed on Dec. 6, 1966, both of which have been abandoned.

BACKGROUND OF THE INVENTION

This invention relates generally to the treatment of pyrite or pyrrhotite materials and, more particularly, it relates to the recovery of elemental sulfur, iron oxide and nonferrous and precious metal values form such materials. The process of the invention is characterized by high recoveries, little loss of reagents, and reasonable operating conditions.

Pyrite or pyrrhotite ores are notoriously difficult to treat in an economic manner, at least for complete recovery of all values. Their relative abundance makes this a perplexing problem. They are often very complex ores, and many contain significant quantities of zinc, lead, copper, silver and gold, in addition to sulfur and iron. The dispersion of these values within the ore is often so fine that even grinding to minus 400 mesh is not sufficient to allow separation by conventional procedures. The contamination of recovered iron values by the nonferrous materials ordinarily rules out usage thereof by iron and steel producers.

The sulfur content of these ores is in the areas of 30–50%, and recovery thereof is economically desirable. Most processes employed heretofore, however, have recovered the sulfur in the form of sulfur dioxide which is converted to sulfuric acid. This is satisfactory if the acid can be sold locally, but is uneconomic if the acid must be shipped appreciable distances. It is usually less economic than elemental sulfur.

OBJECTS OF THE INVENTION

It is a general object of the present invention to provide an improved process for treating these materials.

A further object of the invention is to provide a process for treating pyrite type materials wherein essentially all of the sulfur is recovered in elemental form.

Another object of the invention is to provide a process for treating pyrite type materials wherein the iron values are recovered as high grade iron oxide useful in the iron and steel industry.

Still another object of the invention is to provide a process for treating pyrite type materials wherein the nonferrous metallic values and precious metals are recovered in a form suitable for conventional metallurgical separation and recovery techniques.

A still further object of the invention is to provide a process for treating pyrite type materials that is economic.

Yet another object of the invention is to provide an improved process for treating FeS mattes for recovery of iron values in oxide form and sulfur in elemental form.

A still further object of the invention is to provide a combined fluid bed-acid leaching process for recovering all of the sulfur from pyrite-type materials.

A further object of the invention is to provide a novel fluid bed process for hydrolyzing iron chloride.

Various other objects and advantages of the invention will become clear from the following discussion of several embodiments thereof, and the novel features will be particularly pointed out in connection with the appended claims.

THE DRAWINGS

Understanding of the invention will be facilitated by referring to the following description and specific examples thereof, taken in conjunction with the accompanying drawings, wherein.

DESCRIPTION OF EMBODIMENTS

Figure 1:
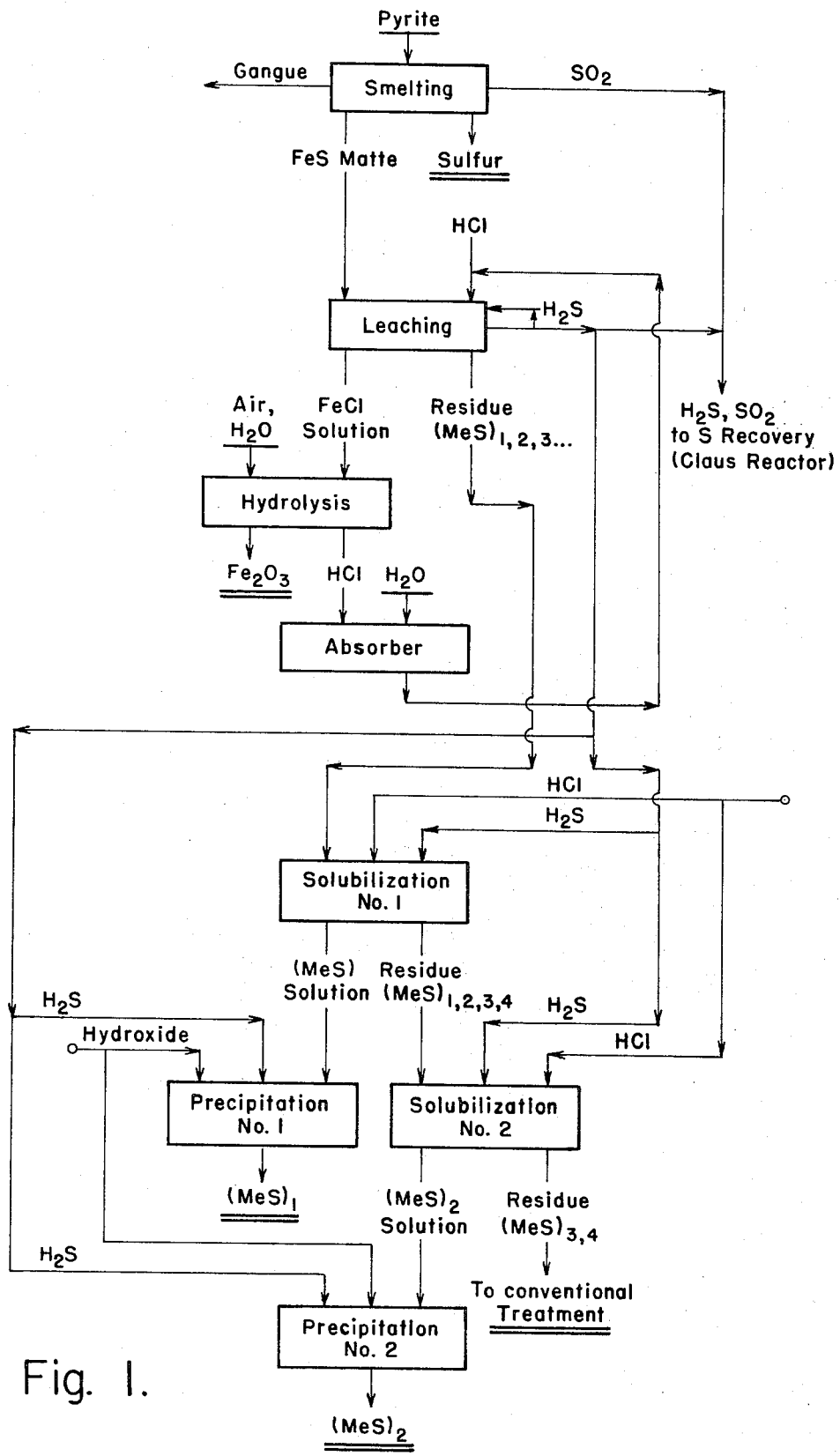
FIG. 1 is a simplified schematic flow sheet illustrating the concept of differential solubilization for the separation of the metallic components.

In essence, the processes of this invention involve a first step to chemically activate the pyrite material and recover labile sulfur, which step may be part of an existing operation, and to convert the pyrite ($FeS_2$) to FeS. Next, the material is leached with hydrochloric acid under conditions controlled to produce a metallic chloride solution, hydrogen sulfide gas and an insoluble residue. The product hydrogen sulfide is recovered and may be converted to sulfur, and the metallic components are separated and recovered from the solutions and insoluble residues.

Essentially, any pyrite or pyrrhotite ore may be employed in the process, or any iron sulfide matte from which the labile sulfur has been driven off. Size reduction may be necessary to insure complete reaction within a reasonable time. A granulated matte (+90% below 1 mm.) is satisfactory, but grinding to minus 200 mesh is preferred.

As noted above, the first step of the process may be a smelting operation wherein the $FeS_2$ is converted to FeS in a non-oxidizing atmosphere with the liberation of elemental sulfur in vapor form, which is condensed and collected. This is a conventional pyrometallurgical treatment and need not be discussed in detail. This first step can be carried out in a suitable reverberatory, electric or flash smelting furnace, at temperatures in the order of 2200°–2600° F., or it can also be done in a roasting machine. If a smelting process is used, the sulfide matte is preferably granulated by water sprays.

In one embodiment of the invention, the ore is fed into a fluidized bed reactor in which air and hydrogen sulfide are the fluidizing gas, and in which the $H_2S$ is burned to provide the heat necessary for heating the pyrite and dissociating the labile sulfur. Temperatures in the fluid bed should be about 1200° to 1400° F. The $H_2S$ can also be burned in a separate combustion chamber and hot combustion gases used to fluidize the bed. This embodiment has the advantage of requiring little extraneous fuel, such as is required in conventional processes, since the hydrogen sulfide is a byproduct of the following leach step. Since there is no liquefaction, lower temperatures are possible than in smelting methods, and heat consumption and losses are proportionately reduced. Sulfur recovery is discussed hereinbelow.

The FeS-bearing material from the fluid bed reactor may be passed directly to the leaching step, but it may be preferred in some instances to first pass it through a conventional flotation or heavy media separation step to remove gangue elements. Whether this step is desirable will, of course, depend on the quantity and nature of the gangue materials in the ore and its prior treatment. While the gangue material is generally acid insoluble, it may affect the leaching rate, and removal prior to leaching produces a residue of more concentrated nonferrous values.

Leaching in HCl under controlled conditions forms the heart of the present invention. The concentrations of the hydrogen and sulfide ions must be controlled to effect the separations required, without significant intermetallic contamination.

Leaching is carried out at temperatures from ambient (60° F.) to 200° F., preferably about 150° F., which insures a rapid reaction. At this temperature, operation near atmospheric pressure is possible as the HCl partial pressure is quite low.

Understanding of the leaching step of the present invention will be facilitated by a more detailed explanation of the mechanisms at work. The conditions which must exist in a solution from which a salt is to be precipitated or dissolved are governed by two equilibria equations. For example, the equations for ZnS would be as follows (brackets signify concentration in gram-ions per liter):

$$[Zn^{++}] \times [S^{--}] = K_{sp} \text{ (solubility product)} \quad (1)$$

$$\frac{[H_3O^+] \times [S^{--}]}{[H_2S]} = K_{ion} \text{ (ionizatinh constant)} \quad (2)$$

The accepted value of $H_2S$ concentration is 0.1 M at 60° F. It is possible to solve equations (1) and (2) to obtain the value of the concentration of acid $[H_3O^+]$ which must exist at equilibrium. Conversely, these equations may be used to determine how much metal is in solution at various acid concentrations. For a given metal ion concentration it is possible to differentially precipitate each of the metallic ions with little or no interconcentration or the leave any of the metallic ions in the residue.

In solution, zinc ions, hydrogen ions, sulfide ions, and chloride ions are all present. By proper adjustment of the pH in the presence of the sulfide ion, the zinc sulfide will be separated.

The leaching step can be generally represented by the following equation:

$$MeS + 2HCl = MeCl_2 + H_2S \quad (3)$$

Four factors will affect this reaction:

a. The concentration of the hydrogen ions.
b. The concentration of the sulfide ions produced by saturating the solution with $H_2S$ gas (this is most important).
c. The concentration of the metallic ions in solution.
d. The temperature of the reaction.

In making a precise and discrete separation of the metallic compounds, knowledge and/or control of each of the above factors is required.

As noted above, the concentration of $H_2S$ in solution is held constant at 0.1 M at 60° F.

The following calculations are for 93.001 grams of a matte having the following composition:

| Element: | Weight, gms. |
|---|---|
| Iron | 56.0 |
| Sulfur | 34.0 |
| Zinc | 1.5 |
| Copper | 1.0 |
| Lead | 0.5 |
| Silver | 0.001 |

This material is placed in one liter of water at 60° F. The following concentration of sulfide and hydrogen ions must exist for reaction 1 at equilibrium:

| Compound | [S--] | [H3O+] | pH at 60° F. | Wt. percent HCl sol'n |
|---|---|---|---|---|
| FeS | $3.7 \times 10^{-19}$ | $5.45 \times 10^{-3}$ | 2.3 | |
| ZnS | $1.96 \times 10^{-22}$ | 0.236 | 0.7 | |
| PbS | $1.82 \times 10^{-24}$ | 7.75 | | 25 |
| CuS | $3.03 \times 10^{-36}$ | $1.96 \times 10^{6}$ | | |
| Ag2S | $1.18 \times 10^{-37}$ | $9.65 \times 10^{7}$ | | |

These calculations show the range of pH values which must be maintained to place FeS, ZnS and PbS in solution. The corresponding strengths of acid, in weight percent HCl, are shown in the above table. It can be appreciated that the CuS and $Ag_2S$ will not be dissolved but will remain as a sludge. This combination of copper and silver sulfides is desirable since methods for their separation are well known.

The calculations were repeated assuming that the concentrations of the constituents were diluted to a tenth of the value used in the previous calculations with the following results.

| Compound | [S--] | [H3O+] | pH at 60° F. | Wt. percent HCl sol'n |
|---|---|---|---|---|
| FeS | $3.7 \times 10^{-18}$ | $1.71 \times 10^{-3}$ | 2.8 | |
| ZnS | $1.96 \times 10^{-22}$ | $7.5 \times 10^{-2}$ | | |
| PbS | $1.82 \times 10^{-24}$ | 2.45 | <0 | |
| CuS | $3.03 \times 10^{-35}$ | $6 \times 10^{5}$ | | |
| Ag2S | $1.18 \times 10$ | $9.7 \times 10^{6}$ | | |

The results are very similar to those obtained in the previous calculations. The most significant change was in the concentration of the hydrogen ion, which decreased by a factor of three for all constituents (i.e. increased pH), except for silver, sulfide, which decreased by a factor of 10. Thus it can be seen that a sharp separation is feasible between copper and silver sulfides and the remaining constituents.

The preceding shows the significant influence of pH on the solubility of the constituents; the results shown in the following table are expressed as weight percent in solution at a particular pH. This is also based on the one liter calculations. The solution must be saturated with hydrogen sulfide or the separation will not be achieved.

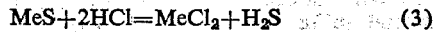

| [H3O+] | pH | Wt. percent acid | [Fe] | [Zn] | [Pb] | [Cu] | [Ag] |
|---|---|---|---|---|---|---|---|
| $1 \times 10^{-5}$ | 5 | $3.4 \times 10^{-4}$ | 0 | 0 | 0 | 0 | |
| $5.45 \times 10^{-3}$ | 2.3 | .05 | 100.0 | 0 | 0 | 0 | |
| $1 \times 10^{-2}$ | 2 | 0.18 | 100.0 | 0 | 0 | 0 | |
| $1 \times 10^{-1}$ | 1 | 18.0 | 100.0 | 0.02 | 0 | 0 | |
| $2.36 \times 10^{-1}$ | 0.7 | 2.5 | 100.0 | 100.0 | 0.09 | 0 | 0 |
| 2 | | 7 | 100.0 | 100.0 | 6.6 | 0 | 0 |
| 4 | | 14 | 100.0 | 100.0 | 26.5 | 0 | 0 |
| 6 | | 20 | 100.0 | 100.0 | 59.7 | 0 | 0 |
| 7.75 | | 25 | 100.0 | 100.0 | 100.0 | 0 | 0 |
| 10.0 | | 32 | 100.0 | 100.0 | | 0 | 0 |

For the metallic sulfide analysis used, it can be seen that iron will start into solution around pH 5 and be completely in solution at a pH of 2.3. Zinc starts into solution about 2.5 and is complete at a pH of approximately 0.7. A similar trend may be seen for the lead. This property forms the basis for the process designated as "differential solubilization" as shown in the schematic flow diagram designated as FIG. 1.

These calculations show that it is possible to make a sharp separation between the copper and silver sulfides and the other metallic sulfides using and maintaining acid strength and sulfide concentration. When the FeS material is treated with 25% to 32% HCl, the calculations show that all of the metallic sulfides except those of copper and silver will be placed in solution. The pregnant liquor, upon separation from the residue of copper and silver sulfides is further treated by adjusting the pH while maintaining the sulfide ion concentration by bubbling $H_2S$ through the solution. Adjusting the pH to 0.7 will precipitate out a minimum of 99.91% of the lead in solution. The remaining lead will precipitate out with the zinc. This is acceptable, since it represents a contamination of less than 0.01%. The liquid remaining after precipitation and removal of the lead sulfide is again treated as outlined above, however, the pH is now adjusted to 2.3. This will precipitate out 99.95% of the zinc. The remaining zinc represents only a 0.001% contamination of the iron and is acceptable. These properties form the basis for the process designated as "differential precipitation" as shown in the schematic flow diagram designated as FIG. 2.

It will be appreciated that ion concentration will vary with the composition of the material to be leached. The effect of increasing temperature on solubility was also calculated. The main effect is due to the decrease in solubility of $H_2S$. The solubility product of various metallic sulfide components was assumed constant for the range of temperatures investigated. Briefly the process depicted in FIG. 1 may be described as follows:

The pyrite is smelted in a non-oxidizing atmosphere to produce a FeS matte, sulfur, a $SO_2$-bearing gas and a gangue which is discarded to waste. The FeS matte is leached with HCl. The pH of the leach solution is held between 2.3 and 5 and saturated with $H_2S$ to insure that only the Fe ion is placed in solution. For complete iron recovery, liquor leaving the leaching step should be as close as possible to pH 2.3, but on the high side. A residue is obtained which contains all of the remaining nonferrous and precious metals and gangue. If the FeS matter contains manganese, the $FeCl_2$ liquor will contain that ion. Fortunately, manganese is a relatively rare constituent of pyrite ores and, even when present, it is not considered deleterious to the operation of the process, because it is one of the few impurities that can be tolerated by iron and steel producers. In any event, the pregnant liquor is hydrolyzed to produce $Fe_2O_3$ and recycle HCl.

The residue is treated as follows: The residue is placed in water and the pH decreased to approximately 2.0–0.7 to place the Zn into solution. The liquor containing the zinc and residue are separated. The pH of the liquor is raised with alkali and saturated with hydrogen sulfide to precipitate the ZnS. The residue is placed in water and the strength of the acid is increased to 25 wt. percent (pH approaching zero) which places the Pb in solution. The liquor and residue are again separated. The pH of the liquor is adjusted to approximately 1, while saturating with $H_2S$, to precipitate PbS. The residue contains CuS and precious metals. This residue may be treated by conventional means such as conversion.

Figure 2:
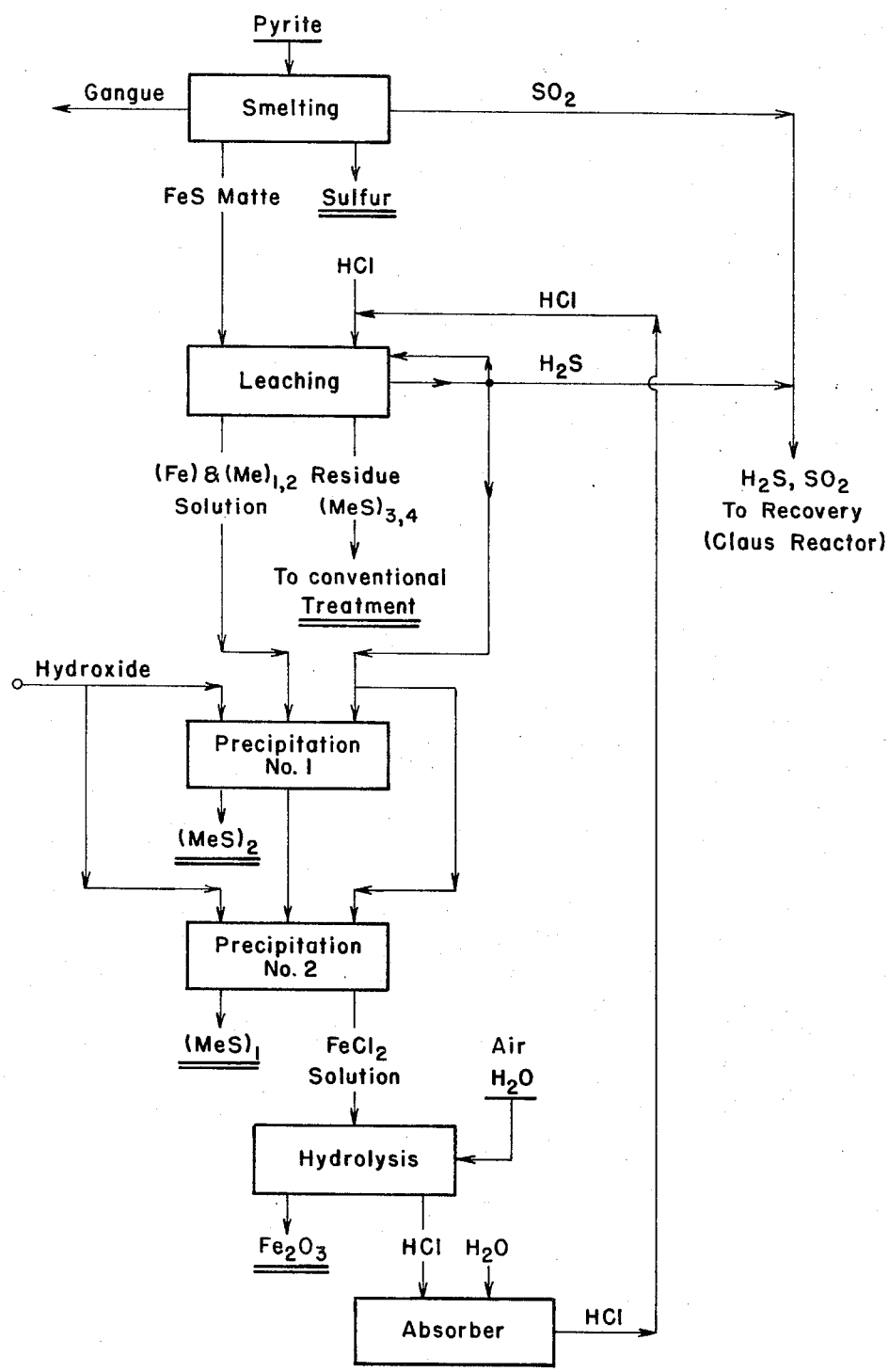
FIG. 2 is a simplified schematic flow sheet illustrating the concept of differential precipitation for the separation of the metallic components.

Briefly the process depicted in FIG. 2 may be described as follows:

The pyrite is smelted in a non-oxidizing atmosphere to produce a FeS matte, sulfur, a $SO_2$-bearing gas and a gangue which is discarded to waste, just as in the FIG. 1 embodiment. The FeS matte is leached with 25–32 wt. percent HCl solution (maintaining the $H_2S$ concentration at saturation), which places all of the metal values in solution except the copper and precious metals. The copper and precious metals residue is separated from the liquor which contains the Zn, Pb and Fe. The liquor is saturated with $H_2S$ and the pH adjusted approximately to a value of 1. PbS precipitates. The liquor and precipitates are separated. The liquor is saturated with $H_2S$ and the pH adjusted to a value of approximately 2. ZnS forms a precipitate. The liquor and precipitate are separated. The liquor, now containing only Fe and Mn if present, is hydrolyzed as described above.

In an alternative embodiment of the invention, a portion of the hydrogen sulfide produced in the leaching step is burned to provide heat for the first step, to drive off labile sulfur and produce $SO_2$ for a Claus reactor. This embodiment is illustrated in FIG. 3.

Hydrogen sulfide gas is generated during the leaching (Eq. 3) and it is necessary to provide for its removal and recovery, under conditions controlled to minimize carry-over of acid. Also during the leach, any arsenic in the pyrite will be evolved as arsine ($AsH_3$), which can be removed from the $H_2S$ stream by hot alum or other means. The leach may be carried out in conventional acid resistant cocurrent leach tanks equipped for gas removal, or it may be carried out in one or more towers where the material to be leached is added near the top, fresh acid solution is added near the bottom, and $FeCl_2$-bearing solution containing insoluble nonferrous and precious metal values is removed near the top. An advantage of this type of leach tower is that the evolving $H_2S$ coming out of the liquid is quite clean and does not really need to pass through a scrubber, although one will generally be provided. More importantly, such a tower is essentially self-regulating with respect to pH and sulfide ion concentration because there is always an excess of FeS to react with residual acid. This tower may be used as depicted in FIG. 4 for the process of FIG. 1. Certain alterations must be made for use of this tower in the process of FIG. 2. In particular, additional acid inlet nozzles ($D_1$, $D_2$) are added as required along the length of the leach tower, to introduce both acid and hydrogen sulfide, to maintain the acid strength of the effluent liquid at 25 wt. percent HCl or above, and to saturate the outgoing liquor with hydrogen sulfide.

Figures 3, 4:
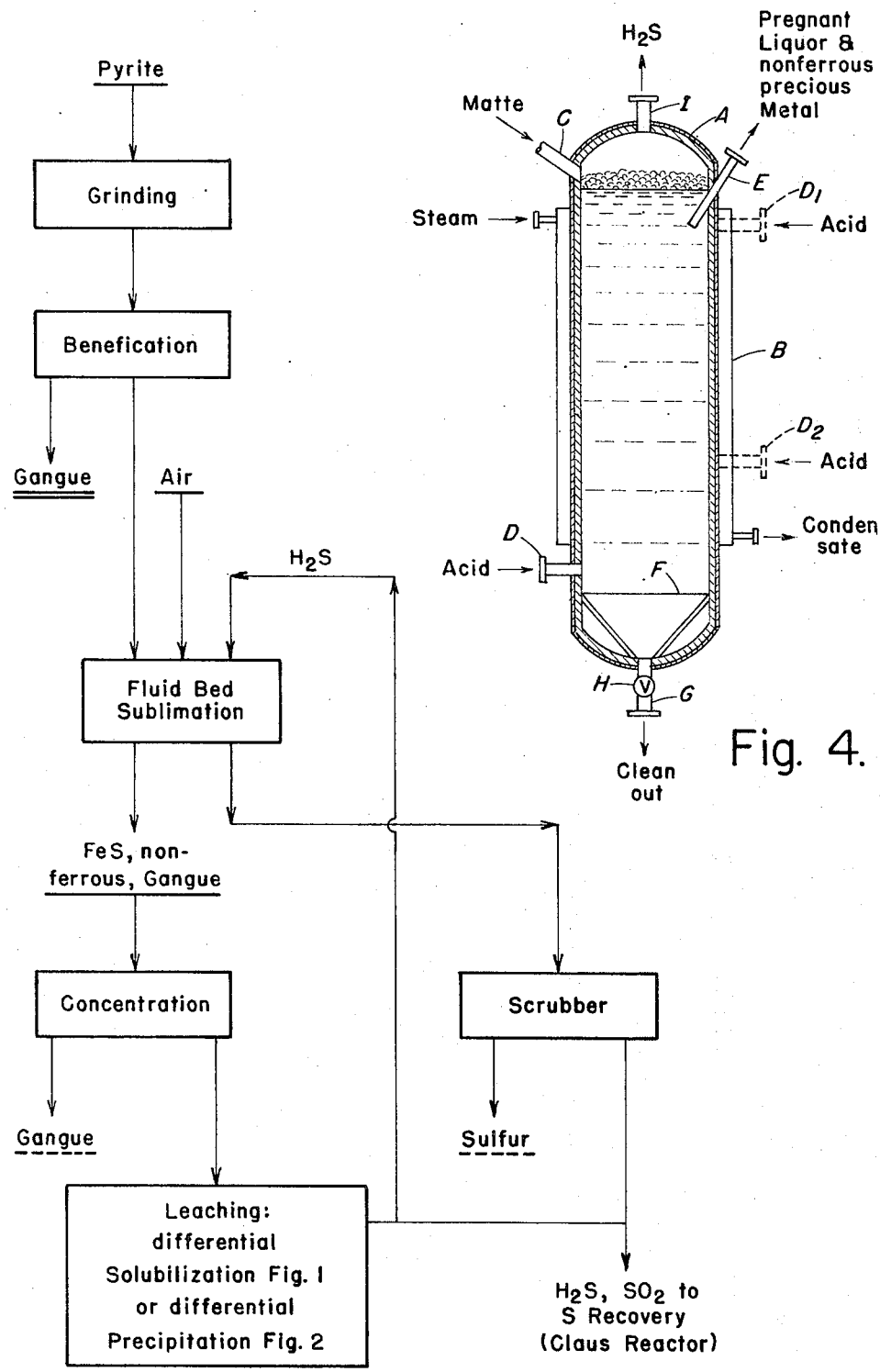
FIG. 3 is a simplified schematic flow sheet illustrating an embodiment of the invention employing a fluid bed reactor in the first step.
FIG. 4 is a cross-sectional elevation view of a leach tower which can be employed in the invention.

FIG. 4 illustrates such a leaching tower. The tower A need only be of carbon steel construction, but should be suitably lined with acid-resistant material. Heat can be supplied by steam jacket B, or other means can be employed. The matte is fed as a granulated solid into the tower at C, at a rate sufficient to keep the liquid surface covered therewith. Fresh acid is pumped through inlet D at a sufficient pressure to overcome the hydrostatic head. Hydrogen sulfide to maintain saturation can be pumped in with the acid or through a separate inlet (not shown). The pregnant liquor and solid residue are drawn out through outlet E on the opposite side of the tower from matte inlet C. Outlet E is downwardly sloped and extends substantially below the liquid surface. A baffle F is also provided at the bottom of the tower to guide descending sludge toward outlet G. The latter fitting is provided with a valve H so that the sludge can occasionally be cleaned out. The added and evolved $H_2S$ is withdrawn through outlet I at the top of the tower.

Gas evolution and the added $H_2S$ provide more than sufficient agitation to bring about complete reaction during the passage of the material through the reactor. Depending on the size of a particular plant, it may be desired to employ a plurality of reactors.

For the embodiment of FIG. 1, it has been discovered that by taking the reactants out near the top of the tower, in the vicinity of the fresh feed, pH control becomes essentially automatic, due to the continuous presence of unreacted FeS which will react with remaining acid in this zone.

After leaching, the pregnant liquor and insoluble residue must be separated, and this is accomplished in conventional thickening and filtration equipment. The filter cake, containing nonferrous and precious metal values, is washed to prevent acid losses, the wash water being added to the pregnant liquor. If the filter cake is to be treated locally by hydrometallurgical techniques, it can be passed directly thereto. If, on the other hand, it is not to be treated locally, or other than hydrometallurgical techniques are to be employed, drying may be necessary.

Whether produced directly in the leach (FIG. 1) or after differential precipitation (FIG. 2), the FeCl₂-bearing filtrate requires hydrolysis, as discussed below. Hydrolysis provides a recycle HCl stream and iron oxide. Depending on how hydrolysis is effected, however, further clarification may be desired. Essentially, any device providing good gas-liquid contact can be employed; two methods are discussed below. The separated pregnant liquor will contain ferrous iron primarily, but depending on contact with air, etc., during later processing a minor proportion may be oxidized to the ferric state.

Hydrolysis of the ferrous chloride in the pregnant liquor is in accordance with the following equation:

$$4FeCl_2 + 4H_2O + O_2 \rightarrow 2Fe_2O_3 + 8HCl \qquad (4)$$

This reaction will go to completion at temperatures above 400° F., but temperatures in the range of 500°–+1000° F. are preferred. It can be carried out in a number of ways. One preferred method involves a preliminary evaporation of water to an FeCl concentration of about 30–50%, followed by hydrolysis in a spray tower wherein drops of the pregnant liquor are passed counter-current or cocurrent to hot combustion gases. A second preferred method involves spray drying of the pregnant liquor to produce monohydrate or anhydrous crystals, followed by hydrolysis in a roaster, fluidized bed or other reactor. It is noted that crystallization in a conventional crystallizer produces multihydrate crystals which are difficult to handle. As a result, crystallization in a spray dryer with resultant monohydrate or anhydrate production is greatly preferred.

When hydrolysis is directly from the liquid, preliminary evaporation is necessary to avoid large volumes of water vapor in the products, which would dilute recovery HCl. It also reduces equipment costs. The concentrated liquor is fed into a spray tower, and is divided into droplets of controlled size by use of a centrifugal disc, spray nozzle or the like. The hydrolysis reaction takes place as these drops fall through the tower counter-current to a rising stream of hot combustion gases. The only solid reaction product, Fe₂O₃, is generally in size range of 200–300 mesh, and, depending on gas velocities, etc., will either drop to the bottom of the tower or be carried out overhead with the gaseous reaction products and the combustion gases. In most cases, iron oxide will be collected from both sources. The overhead gases are run through one or more high temperature cyclones to separate entrained iron oxide. Total recovery of iron oxide is generally 98% or more. The hot gases and liquid can also pass through the tower cocurrently. The powder is cooled either in air or by dropping it into water. The latter method has the advantage of automatically leaching out any contained chlorides, and also delivers the powder in a slurry form for balling and sintering. Dusting problems are avoided in this manner.

As noted above, it is also possible to crystallize ferrous chloride from the pregnant liquor and use the crystals as the starting material for hydrolysis. For example, a muffled multiple-hearth roaster can be used as a hydrolyzer. In this case, recovery of HCl can be simplified because it is not diluted with other combustion gases. Such furnaces have limited capacity however, and trouble has been experienced with incomplete reaction and sticking of crystals.

A novel and preferred method of hydrolyzing monohydrate or anhydrate ferrous chloride crystals involves injection thereof into a fluidized bed of iron oxide particles, in which the fluidizing gas is a mixture of air and superheated steam. This combination is found advantageous for complete hydrolysis because it has been determined that high temperatures and/or a high partial pressure of water vapor encourages the reaction to go to completion.

The crystals are inserted into a fluidized bed of iron oxide powder formed by previous hydrolysis. The combination of violet agitation normal in a fluidized bed and large proportions of free flowing iron oxide powder will overcome any tendency of the crystals to agglomerate; this dispersing of the chloride crystals will accelerate the kinetics of chloride hydrolysis. The presence of iron oxide powder, though it is a product of the reaction, will not seriously retard the reaction since it will be in its standard state and has a unit activity regardless of the quantity involved.

Fluidizing air is introduced at the bottom of the bed along with superheated steam. In this way the water vapor partial pressure can be accurately controlled; the violent agitation of the fluidized bed will insure even distribution of water vapor throughout the reaction system. Similarly, the hydrogen chloride gas concentration can be controlled independently by the ratio of gas throughput to iron chloride feed rate. Heat is supplied directly, by heating the fluidized gases and/or steam, or indirectly, by heat transfer from an external jacket or from internal pipes. High pressure steam, heat transfer fluids or hot combustion gases can all be used. While this process can be carried out in cylindrical or square fluidizing chambers, other shapes can also be used advantageously. For example, a dual sectioned reactor can be used in which one section houses the fluid bed while hot waste gases from a smelter furnace or combustion gases from a burner pass through an adjacent section to supply heat for the hydrolysis reaction; annular shaped reactors or similar devices can also be used for this purpose. Heat can also be supplied by introducing powdered carbon or similar combustible material either with the chloride crystals or separately. The oxides of carbon formed act as inert gases and do not interfere in recovery of the hydrogen chloride vapors. Hot combustion gases can also be used, provided their water vapor content does not exceed the desired operating level for water vapor, which would dilute recovered HCl. In any event, the bed temperatures should be in the range of 500° to 900° F.

Hydrogen chloride gas, water vapor and inert gases are removed overhead to a recovery section. The iron oxide can be removed from the reaction system or transferred to another section to remove residual traces of chloride. Rate of oxide removal from the fluid bed is controlled to maintain a nearly constant inventory of oxide therein. Quenching in water will leach out residual chlorides, as noted above.

The chief features of this preferred embodiment are the use of a fluid bed, either in single or mutliple stages, as a reactor and the use of predetermined, controlled water partial pressures and reaction bed temperatures. These factors provide more sensitive control of reaction conditions, fuel savings and greater freedom in the choice of pre-hydrolysis processing.

Whatever type of hydrolysis is employed, an HCL-vapor bearing gas is ultimately recovered, and this is scrubbed countercurrently with dilute hydrochloric acid to produce a leaching acid of about 18–20% concentration, though higher concentrations can be obtained.

Attention is now directed to the sulfur recovery portion of the process. The leaching step produces a quantity of H₂S no matter how the leach is carried out. No matter what type of reactor is used for the first step, the gaseous products will include sulfur vapor, SO₂, combustion gases, and perhaps some H₂S. Elemental sulfur must be recovered, and the remaining sulfur compounds must be converted thereto. The compositions of the combined sulfur-bearing streams produced in the instant invention are suited for recovery by the Claus process. In the Claus process, a catalytic converter is operated at about 540° F. where the following reaction takes place:

$$2H_2S + SO_2 \rightarrow 3S + 2H_2O \qquad (5)$$

The catalyst is alumina with usual carriers, promoters, etc. The reaction products are passed through a condenser where substantially all of the elemental sulfur is liquefied and separated. The efficiency of a single stage operation is about 75–80%, and can be raised above 90% with the inclusion of one or two additional stages.

The application of this process to the instant invention is clear: where conventional smelting is carried out, and after elemental sulfur is removed, furnace gases are burned to convert all sulfur compounds to $SO_2$, after which they are passed through a waste heat boiler. If there is a deficiency of $SO_2$, some $H_2S$ from the leach can be burned to provide the same. The $SO_2$ and $H_2S$ are then passed to the Claus reactor. When a fluidized bed is used to f drive off labile sulfur, air and some of the $H_2S$ from the leach are used as the fluidizing gas, and $SO_2$ is produced in the reaction. Thus, in either case, $H_2S$ and $SO_2$ are available. Of course, the gases are first scrubbed to remove elemental sulfur before treatment by the Claus process.

Since the reaction is not 100% complete, it is desirable to operate the system with an excess of $H_2S$ in the feed, because this insures substantial complete conversion of $SO_2$. The uncondensed gases from the sulfur condenser will thus contain $H_2S$ but little if any $SO_2$, which is desirable because $H_2S$ is much easier to recover than $SO_2$. Depending on the $H_2S$ content of the condenser off-gas, it may be oxidized and directly recycled, or the $H_2S$ may be initially separated by scrubbing and then recycled. As noted above, the proportions of sulfur recovered initially as $H_2S$ and $SO_2$ will vary depending on the scheme employed, and its disposition will vary accordingly. For example, the $SO_2$ content of smelter gases will be about 4–5%, but from a fluid bed roaster the gases will run from about 10 to 16% $SO_2$, the latter figure representing stoichiometric burning.

Understanding of the invention will be facilitated by referring to the following specific examples:

EXAMPLE I

The feasibility of the HCl leach and the selectivity of same were tested on a sample of an FeS matte produced in an existing plant. The matte had the following analysis of essential elements: in weight percent:

Fe ............................................................. 59.7
S .............................................................. 30.0
Zn ............................................................ .11
$SiO_2$ ....................................................... 1.75
Cu ............................................................ 0.08
Other ........................................................ 8.36

The remainder was essentially gangue materials and oxides.

Samples of the above material were tested in the as-received condition and ground to minus 200 mesh. In each test, 40 gms. of material were dropped into 200 ml. of 20% HCl and agitated. Tests were carried out at ambient temperature (75° F.) and 150° F. Initial room temperature tests showed that reaction was incomplete after 60 minutes. At 150° F., reaction had slowed after 10 minutes and was complete after 20 minutes. Filtration and washing were carried out using standard procedures, the filter cake was dried and weighed, and the pregnant liquor analyzed. In each of seven tests, the residue weighed about 1–3 grams, and the total iron in solution (leach plus wash) was within the range of 22–25 grams. The pregnant liquors were all clear green solutions of pH 1–1.5, and qualitative tests for zinc and copper all showed negative results. No effort was made to recover $H_2S$, but evolution of same was manifest during the tests.

EXAMPLE II

Operation of a plant treating 660,000 tons per year of pyrite is described.

This plant has a pyrite flash-smelting furnace. Wet pyrite concentrate is dried in a rotary drier and held until needed in a dry concentrate storage area. The furnace produces approximately 92,000 pounds per hour (385,000 t.p.y.) of matte. Associated with the furnace and treating the furnace gases are a waste heat boiler, a precipitator for dust removal, a scrubber for sulfur removal, an oxidizer for converting other sulfur compounds to $SO_2$, a second waste heat boiler and an ammonia scrubber.

Figure 5:
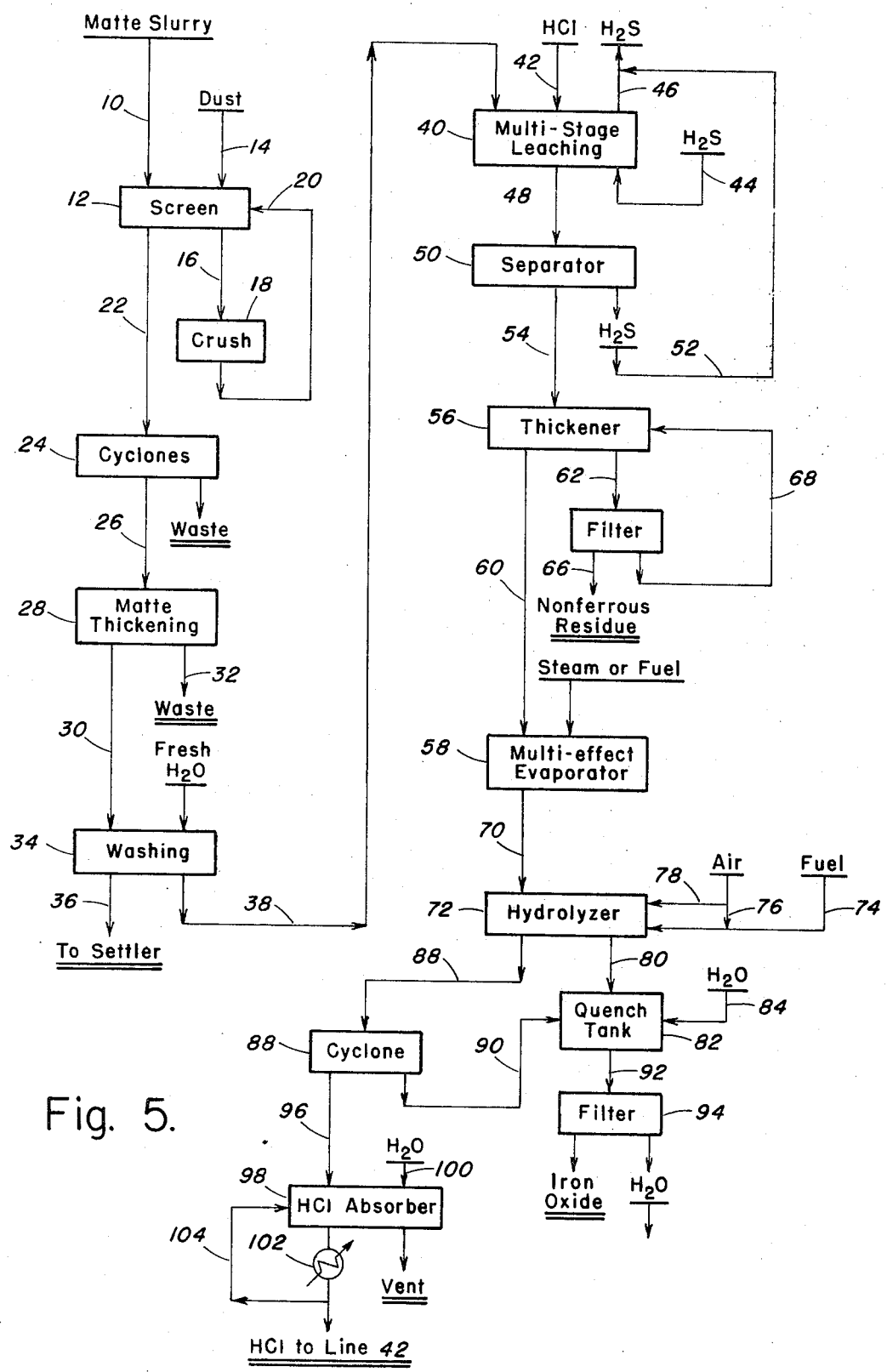
FIG. 5 is a simplified, schematic flow sheet of a plant designed to treat 385,000 tons per year of an iron sulfide matte in accordance with the invention.

Matte preparation, leaching, hydrolysis and oxide and acid recovery are illustrated schematically in FIG. 5, and a summary of material flow is set forth in the tables hereinbelow.

In this plant the molten matte is conveyed in a launder into a protective enclosure where it is contacted by high pressure jets of sea water, producing a slurry of granulated matte in sea water. Granulation produces particles from 10 mm. to 5 mm., but at least 90%, and usually 98% are minus 1 mm. The matte, at 10, is conveyed onto a screen 12 set to pass material smaller than 1 mm. Recycle dust 14 is added. The latter amounts to about 11,000 lbs./hr. The dust comes from several sources, principal among which is a precipitator associated with the waste heat boiler in the smelter. Depending on particle size, dust can go directly to the leaching step, and in some instances it may be desirable to treat all dust in a parallel but separate process stream. In the instant case, however, all dust is screened. Oversize from screen 12 passes in a gravity chute 16 to matte crusher 18. After crushing, this fraction is slurried and returned to screen 12 via line 20.

It is desirable to replace the sea water with fresh water prior to leaching, so undersize material passing screen 12 is pumped via line 22 into a plurality of staged cyclones 24 where excess water is separated overhead and passed to waste. The matte slurry is then pumped in line 26 to a conventional thickener 28 from which a thickened slurry is withdrawn in line 30. The overflow from thickener 28 is also passed to waste (or a settling pond) in line 32.

The slurry is then water washed in a two-stage washing unit 34, overflow passing at 36 to a settling pond (or to waste), and underflow, now having the proper consistency for leaching and being free of salts, passing in line 38 into the leach circuit.

It should be noted that the thickening stage of matte slurry preparation may be accompanied by addition of flotation reagents, frothers, conditioners, etc., with suitable agitation to accomplish an essentially complete removal of gangue elements at this stage.

Laching is carried out in several stages at 40 concurrent to acid added at 42. Hydrogen sulfide from the Claus plant compressor is added via line 44 to assist in agitation of the slurry and to maintain saturation, as described hereinabove. The $H_2S$ is removed in line 46, and, prior to being passed to the Claus plant, is cleaned in a suitable scrubber (not shown).

The leach tank is rubber lined, contains several stages set up for concurrent leaching, and is agitated. It is preferably operated at 150° F. and a low pressure, with the temperature being maintained by preheating the acid with low-pressure steam. The pressure is controlled by the rate of $H_2S$ removal. With operation of the leach at near atomspheric pressure, some $H_2S$ will remain dissolved in the leach slurry and, to prevent $H_2S$ leakage and to recover as much as possible thereof, the slurry is passed from the leach step into line 48 and a separator 50 operated at subatmospheric pressure by means of a steam ejector (not shown). Evolved $H_2S$ (and the steam) are pumped in line 52 to the primary $H_2S$ stream in line 46 and passed to a scrubber.

The substantially $H_2S$-free slurry is passed in line 54 to a thickener 56 for primary separation of the pregnant liquor from the insoluble residue containing nonferrous and precious metal values. Overflow from thickener 56 goes directly to the evaporators 58 via line 60, and the sludge extracted from the bottom of thickener 56 is pumped in line 62 to a drum filter 64. The filter cake is washed on the drum and, after being scraped off, it is conveyed at 66 to drying and shipping (the instant plant is not equipped for recovery of the sulfide residue according to the differential solubilization embodiment of the invention). Filterate, including wash water, is pumped in line 68 back to thickener 56.

The pregnant liquor is concentrated to about 30% $FeCl_2$ in a multiple effect evaporator system 58 with heat being supplied by 50 p.s.i.g. steam. Other energy sources can, of course, be used; for example submerged combustion of a fuel, but steam is readily available herein. During evaporation, the pregnant liquor is heated to about 230° F. and it is passed in line 70 to hydrolyzer 72 at this temperature.

The hydrolysis must be carried out under oxidizing conditions to obtain $Fe_2O_3$. Fuel oil 74 and combustion air 76 are burned at the bottom of hydrolyzer 72 to provide combustion gases at about 2,000° F. Additional air 78 is provided to atomize the pregnant liquor at the top of the tower. Solids are removed from the bottom of hydrolyzer 72 on a vibrating conveyor 80 and passed to a quench tank 82 supplied with fresh water 84. Overhead from hydrolyzer 72, including combustion gases HCl vapor, water vapor and entrained solids, is passed in line 86 to higher temperature cyclone 88, where solids are removed and returned to quench tank 82 via line 90. The hydrolysis tower could also be operated cocurrently, in which case all reaction products would be passed to cyclone 88.

A water-iron oxide slurry is formed in quench tank 82, and is passed in line 92 to a disc filter 94 where the water is removed and a pure iron oxide filter cake is recovered. The water is recycled to the matte washing step and the oxide is processed into hard pellets by conventional means (mixing with a binder, balling, sintering, etc.).

Solid-free gases from cyclone 88 are passed in line 96 to HCl absorber 98, which is supplied with fresh water 100. An HCl cooler 102 cools withdrawn HCl, a portion of which is recirculated via line 104. The HCl gas is actually absorbed in dilute HCl, in accordance with conventional practice. Net underflow is passed to storage for reuse in the leach step. Scrubbed gases are vented.

There is set forth hereinbelow a tabular summary of the principal process stream flows, keyed to FIG. 5. Where significant, operating temperatures are also given.

| Process line or unit | Constituent | Lbs./hr. | ° F. |
|---|---|---|---|
| 20 | Solids | 103,319 | |
| | Water | 2,699,317 | |
| 38 | FeS | 74,654 | |
| | FeO | 10,734 | |
| | CaO, SiO$_2$, etc | 4,388 | |
| | PbS, ZnS, CuS, Au, Ag | 8,545 | |
| | H$_2$O | 103,319 | |
| 54 | FeCl$_2$ | 133,850 | 150 |
| | H$_2$O | 414,050 | |
| | CaO, SiO$_2$, etc | 4,388 | |
| | PbS, ZnS, etc | 8,545 | |
| | HCl | 10 | |
| 70 | FeCl$_2$ | 133,650 | 230 |
| | H$_2$O | 300,463 | |
| | PbS, ZnS, etc | 10 | |
| | CaO, SiO$_2$, etc | 2 | |
| 80+90 | Fe$_2$O$_3$ | 83,635 | 1,292 |
| | FeCl$_2$ | 787 | |
| | PbS, ZnS, etc | 10 | |
| | CaO, SiO$_2$, etc | 2 | |
| 96 | N$_2$ | 206,076 | 482 |
| | CO$_2$ | 51,920 | |
| | SO | 960 | |
| | H$_2$O | 199,444 | |
| | HCl | 86,950 | |

EXAMPLE III

The feasibility of dissociating pyrite in a fluidized bed in an inert atmosphere was determined.

The pyrite used had the following analysis of essential elements:

| | Percent |
|---|---|
| Fe | 41.5 |
| S | 33.9 |
| Zn | 1.15 |
| Pb | 0.24 |

The pyrite was ground to minus 100 mesh and roasted in a fluidized bed for 30 minutes at about 700° C. (1292° F.). The roasted pyrite analyzed as follows:

| | Percent |
|---|---|
| Fe | 52.7 |
| S | 33.6 |
| Zn | 1.38 |
| Pb | 0.38 |

The roasted material was then leached with the stoichiometric equivalent of 20% HCl at 150° F. for 60 minutes. The leach residue was analyzed and was found to contain 2.44% Fe, 35.5% S, and 2.9% Zn, indicating an iron extraction (as $FeCl_2$) of 99.3%.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A process for treating FeS bearing materials containing lead and zinc values, comprising:
   leaching said FeS bearing material, in finely divided form, with a hydrochloric acid solution of no more than about 32% concentration and at a temperature within the range of about 60° to 200° F. to form a pregnant liquor and a residue with the evolution of hydrogen sulfide, said solution being maintained saturated with hydrogen sulfide by introducing and passing hydrogen sulfide therethrough during leaching, and the pH of the solution at completion of said leaching being about 2.3 to 5, whereby iron values are solubilized and lead and zinc metal values remain in a residue;
   separating a pregnant liquor from the insoluble residue;
   leaching said insoluble residue with a hydrochloric acid solution and with hydrogen sulfide saturation, with pH controlled from about 0.1 to 2.0, whereby zinc values are solubilized to produce a zinc-free residue;
   separating a zinc bearing liquor from a lead bearing residue;
   maintaining hydrogen sulfide saturation of said zinc-bearing liquor and raising the pH thereof by addition of alkali to at least 2.5 whereby zinc sulfide is precipitated; and
   recovering said zinc sulfide.

2. The process of claim 1 and further comprising:
   leaching the lead bearing residue with a 25 to 32% hydrochloric acid solution and with hydrogen sulfide saturation, whereby lead values are solubilized; separating a lead bearing liquor from a lead free residue; maintaining hydrogen sulfide saturation of said lead bearing liquor and reusing the pH thereof to at least 1, whereby lead sulfide is precipitated; and recovering the lead sulfide.

3. The process of claim 1 wherein the pH at the completion of leaching said FeS bearing material is about 2.3.

4. The process of claim 3 and further comprising:
   hydrolyzing the pregnant liquor at elevated temperatures in an oxidizing atmosphere to form solid iron oxide, hydrochloric acid vapor and water vapor;

recovering the solid iron oxide; and
recovering hydrochloric acid for use in said leaching.

5. The process of claim 4 wherein the FeS bearing material is leached at about 150° F.

6. A process as claimed in claim 4, wherein said hydrolysis comprises:
evaporating said pregnant liquor to an $FeCl_2$ concentration of about 30 to 50% by weight; and
spraying the concentrated liquor into contact with hot, oxygen-bearing combustion gases at temperatures above 500° F., thereby forming iron oxide, and HCl vapor.

7. A process as claimed in claim 4 wherein said hydrolysis comprises:
crystallizing ferrous chloride monohydrate or anhydrate from said pregnant liquor;
passing said iron chloride crystals into a fluidized bed of iron oxide particles; said bed being fluidized by a mixture of air and superheated steam, whereby iron oxide is formed; and
said vapors being removed overhead from said bed.

8. A process as claimed in claim 7 wherein said bed is maintained at a temperature in the range of 500°–1000° F.

9. A process as claimed in claim 8 wherein iron oxide particles are withdrawn from said bed at a rate sufficient to maintain a substantially constant inventory thereof within said bed.

10. A process as claimed in claim 4 wherein said FeS bearing material is obtained by initially heating a pyritic ore or concentrate in a nonoxidizing atmosphere to a temperature sufficient to volatilize labile sulfur.

11. A process as claimed in claim 10 wherein said initial heating step is carried out in a smelting furnace, and additionally comprising scrubbing effluent gases therefrom and recovering elemental sulfur.

12. A process as claimed in claim 10 wherein heat for said initial heating step is provided by burning hydrogen sulfide from said leaching step in air.

13. A process for treating FeS bearing materials containing lead and zinc values comprising:
leaching said material, in finely divided form, with a hydrochloric acid solution of about 25–32% concentration and at a temperature within the range of about 60°200° F. to form a pregnant liquor and a residue with the evolution of hydrogen sulfide, said solution being maintained saturated with hydrogen sulfide by introducing and passing hydrogen sulfide therethrough during leaching, and the pH of the solution at completion of said leaching being no greater than 0.5, whereby iron values, lead and zinc are solubilized to produce a pregnant liquor and an insoluble residue;
maintaining said pregnant liquor saturated with hydrogen sulfide and raising the pH thereof by addition of alkali to 0.7, thereby precipitating lead values as lead sulfide to produce a lead-free liquor.
separating and recovering said lead sulfide from the lead-free liquor;
maintaining said lead-free liquor saturated with hydrogen sulfide and raising the pH thereof by addition of alkali to 2.3, thereby precipitating zinc values as zinc sulfide to produce a zinc free liquor containing the iron values; and
separating said zinc sulfide.

14. The process of claim 13 wherein the FeS bearing material is leached at about 150° F.

15. The process of claim 13 and further comprising:
hydrolyzing the zinc free liquor containing iron values at elevated temperatures in an oxidizing atmosphere to form solid iron oxide, hydrochloric acid vapor and water vapor;
recovering the solid iron oxide; and
recovering hydrochloric acid for use in said leaching.

16. A process as claimed in claim 15 wherein said hydrolysis comprises:
evaporating said zinc free liquor containing iron values to an $FeCl_2$ concentration of about 30 to 50% by weight; and
spraying the concentrated liquor into contact with hot, oxygen-bearing combustion gases at temperatures above 500° F., thereby forming iron oxide, and HCl vapor.

17. A process as claimed in claim 15 wherein said hydrolysis comprises:
crystallizing ferrous chloride monohydrate or anhydrate from said zinc free liquor containing iron values;
passing said iron chloride crystals into a fluidized bed of iron oxide particles;
said bed being fluidized by a mixture of air and superheated steam, whereby iron oxide is formed; and
said vapors being removed overhead from said bed.

18. A process as claimed in claim 17 wherein said bed is maintained at a temperature in the range of 500° to 1000° F.

19. A process as claimed in claim 18 wherein iron oxide particles are withdrawn from said bed at a rate sufficient to maintain a substantially constant inventory thereof within said bed.

20. A process as claimed in claim 15 wherein said FeS bearing material is obtained by initially heating a pyritic ore or concentrate in a non-oxidizing atmosphere to a temperature sufficient to volatilize labile sulfur.

21. A process as claimed in claim 20 wherein said initial heating step is carried out in a smelting furnace, and additionally, comprising scrubbing effluent gases therefrom and recovering elemental sulfur.

22. A process as claimed in claim 20 wherein heat for said initial heating step is provided by burning hydrogen sulfide from said leaching step in air.

23. A process for treating iron sulfate bearing materials which also contain at least one of copper, lead and zinc values, comprising:
leaching the FeS bearing material, in finely divided form, with a hydrochloric acid solution of no greater than 32% concentration and at a temperature from about 60° to 200° F., said solution being maintained saturated with hydrogen sulfide by introducing and passing hydrogen sulfide therethrough during the leaching, and the pH of the solution at completion of said leaching being about 2.3 to 5, whereby essentially only iron values are solubilized to form a pregnant liquor; and
separating the pregnant liquor containing the iron values from an insoluble residue.

24. The process of claim 23 wherein the pH at the completion of leaching said FeS bearing material is about 2.3.

25. The process of claim 24 and further comprising:
hydrolyzing the pregnant liquor at elevated temperatures in an oxidizing atmosphere to form solid iron oxide, hydrochloric acid vapor and water vapor;
recovering the solid iron oxide; and
recovering the hydrochloric acid for use in said leaching.

References Cited
UNITED STATES PATENTS

| | | | |
|---|---|---|---|
| 1,197,590 | 9/1916 | Bacon | 423—101 |
| 1,335,001 | 3/1920 | Hovland et al. | 75—101 R |
| 1,793,906 | 2/1931 | Christensen | 423—101 |
| 3,310,435 | 3/1967 | Robinson, Jr., et al. | 423—150 |
| 3,258,332 | 6/1966 | Gravenor et al. | 423—140 |
| 1,937,633 | 12/1933 | Christensen | 423—561 |
| 2,943,929 | 7/1960 | Norman | 423—159 |
| 1,607,206 | 11/1926 | Neill. | |

(Other references on following page)

UNITED STATES PATENTS

| | | |
|---|---|---|
| 1,892,999 | 1/1933 | Ralston et al. |
| 1,980,809 | 11/1934 | Levy — 204—117 |
| 2,092,386 | 9/1937 | Baehr et al. |
| 2,109,755 | 3/1938 | Sessions. |
| 2,491,844 | 5/1949 | Strelzoff. |
| 2,609,272 | 11/1952 | Udy. |
| 2,637,629 | 5/1953 | Lewis. |
| 2,642,339 | 6/1953 | Sawyer. |
| 2,723,904 | 11/1955 | Reeve — 423—633 |
| 2,755,172 | 7/1956 | McGauley et al. |
| 2,771,344 | 11/1956 | Michel et al. |
| 2,805,938 | 9/1957 | McGauley. |

FOREIGN PATENTS

| | | |
|---|---|---|
| 2,012,551 | 3/1928 | Levy et al. |

OTHER REFERENCES

Perry: "Chemical Engineers' Handbook," McGraw-Hill Book Co., 1950, pp. 116, 117, 119, and 128. TP 155 P4

Schlesinger, H. I.: "General Chemistry," 4th ed., Longman, Green and Co., 1953, p. 468. Available in Group 113

OSCAR R. VERITZ, Primary Examiner

H. S. MILLER, Assistant Examiner

U.S. Cl. X.R.

75—111; 423—481, 561, 571, 633